UNITED STATES PATENT OFFICE.

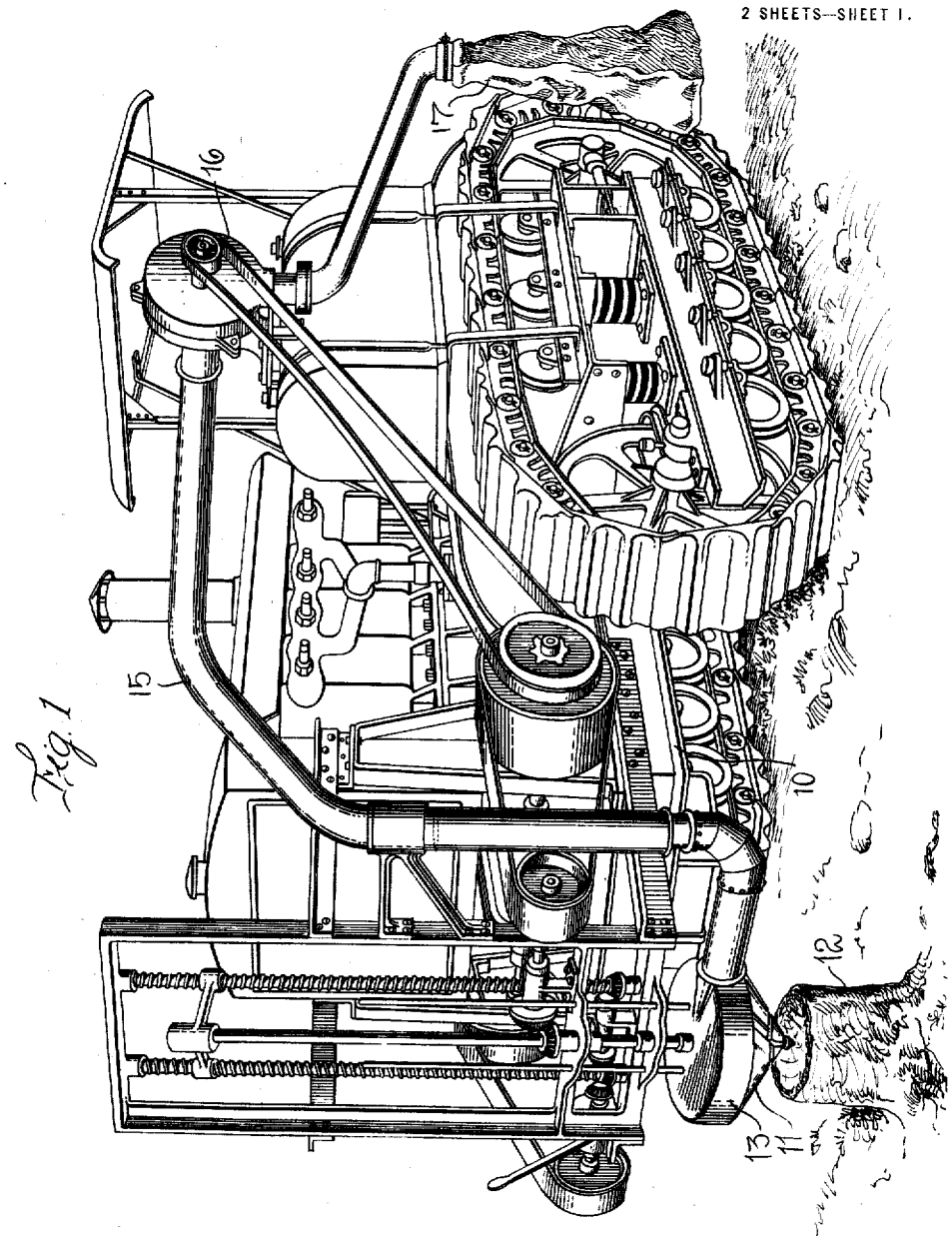

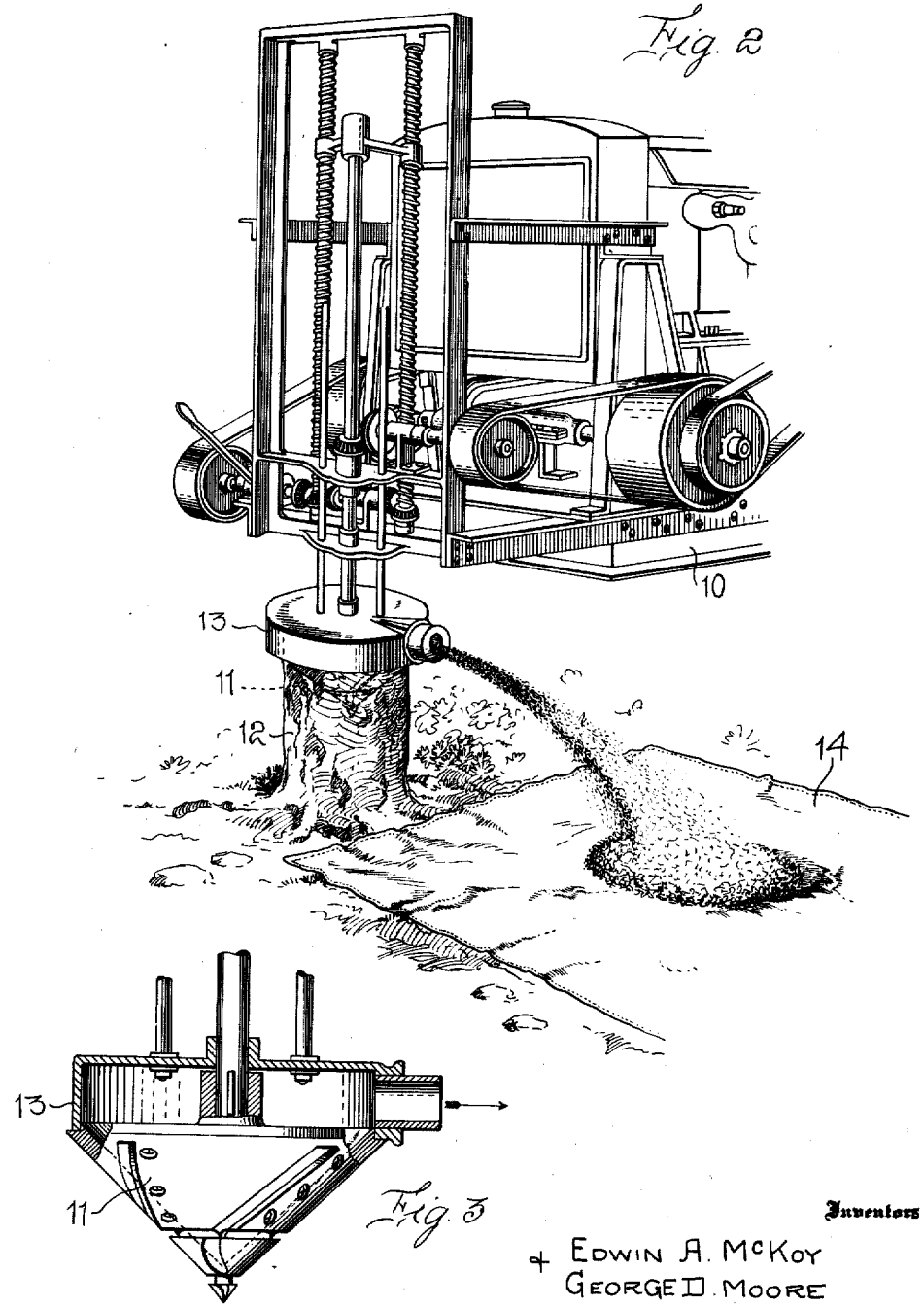

EDWIN A. McKOY AND GEORGE D. MOORE, OF NEW ORLEANS, LOUISIANA.

METHOD OF HARVESTING STUMPS.

1,313,709.  Specification of Letters Patent.  Patented Aug. 19, 1919.

Application filed September 21, 1917, Serial No. 192,567. Renewed July 9, 1919. Serial No. 309,767.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Methods of Harvesting Stumps; and they do hereby declare the following to be a full, clear and exact description of the invention, such as will enable others skilled in the art to which it appertains to make and use the same.

This invention relates to a method of harvesting stumps and has for an object to provide a method of disintegrating stumps and conserving the disintegrated material for further use in the arts.

A further object of the invention is to disintegrate material of standing stumps to such physical condition as to be readily acted upon by heat or chemically and conserving the disintegrated material for further action or utilization as indicated.

In carrying forward the present invention a great variety of mechanical appliances can be employed. In a co-pending application filed by these applicants, coincidentally herewith, is disclosed a mechanism which can be employed in carrying out the present process although the present process or method is not confined to the use of such specific mechanism. For the purpose of better illustrating one of the mechanisms for carrying into effect this method, the mechanism which forms the subject matter of the co-pending application, is illustrated again herewith.

In the drawing:

Figure 1 is a perspective view of the improved mechanism mounted upon a dirigible power plant of the type ordinarily known as a caterpillar;

Fig. 2 is a perspective view of the invention disclosing a different manner of conserving the cuttings from the boring tool, and Fig. 3 is a view partly in side elevation and partly in diametrical section of the boring tool and housing therefor.

As disclosed in said co-pending application the device there illustrated comprises a tractor or power plant mounted upon a dirigible vehicle indicated as a whole at 10. The disintegrating mechanism comprises a boring tool 11 driven from the dirigible power plant by mechanism which will rotate the boring tool and at the same time move it vertically into engagement with the stumps disclosed at 12. Over the boring tool is a housing 13 from which a disintegrated material may be discharged directly to any convenient receptacle as the sheet 14 (as shown at Fig. 2) or through a conduit 15 and exhaust mechanism 16 to a receptacle as the bag 17.

The advancing of the cutting tool and its simultaneous rotation will serve to cut and disintegrate the stump 12 cutting the material up into small particles of granular appearance similar in general appearance to saw dust. In many parts of the country there are standing stumps containing valuable ingredients which can be extracted from the material chemically or by heat as for instance, the standing stumps of former turpentine forests which contain very large percentages of turpentine and rosin, which can be extracted from the disintegrated material. The grinding, cutting or disintegrating of the stumps, therefore, not only conserves the material of the stumps but simultaneously removes the stump from the land rendering the land more valuable. In efforts heretofore made for cutting or grinding standing stumps no provision has been made for conserving the cut material and the present invention relates to the conserving of such material for further action or utilization. The utilization of the material disintegrated from the stumps will form the subject matter of other and further application.

We claim:—

1. The process of harvesting stumps which comprises, providing a hollow conical cutter head having knives arranged to deliver inwardly into the hollow of the head and of a diameter approximately as large at least as the diameter to be harvested and applying said head to the upper end of a stump and forcing it downwardly therein while rotating the head.

2. The process of harvesting stumps which comprises, providing a hollow conical cutter head having knives arranged to deliver inwardly into the hollow of the head and of a diameter approximately as large as the diameter to be harvested, providing a housing to receive the cuttings from the interior of the head and deliver them to a pre-determined depository and applying said head to the upper end of a stump and forcing it downwardly while rotating the head and holding the housing from rotation.

3. The process of harvesting stumps which comprises, providing a cutter head of a diameter approximately as large as the diameter to be harvested, with a housing about said cutter head, said cutter head arranged to deliver the cuttings into the housing and the housing arranged to deliver the cuttings to a predetermined depository and applying the said head to the upper end of a stump and forcing the cutter and housing downwardly while rotating the cutter head and holding the housing against rotation.

4. The process of harvesting stumps which comprises, providing a hollow cutter head having knives upon its exterior arranged to deliver cuttings inwardly into the hollow of the head and of a diameter approximately as large as the diameter to be harvested and applying said head to the upper end of a stump and forcing it downwardly therein while rotating the head.

5. The process of harvesting stumps which comprises, providing a hollow cutter head having knives arranged to deliver cuttings into the hollow of the head and of a diameter approximately as large as the diameter to be harvested, providing a housing to receive the cuttings from the interior of the head and deliver them to a pre-determined depository and applying said head to the upper end of a stump and forcing it downwardly therein while rotating the head.

6. The process of harvesting stumps which comprises, providing a hollow cutter head of a diameter approximately as large as the diameter to be harvested, with a housing about said cutter head, said cutter head arranged to deliver the cuttings into the housing and the housing arranged to deliver the cuttings to a predetermined depository and applying the said head to the upper end of a stump and forcing the cutter and housing downwardly while rotating the cutter head and holding the housing against rotation.

In testimony whereof we affix our signatures.

EDW. A. McKOY.
GEORGE D. MOORE.